UNITED STATES PATENT OFFICE.

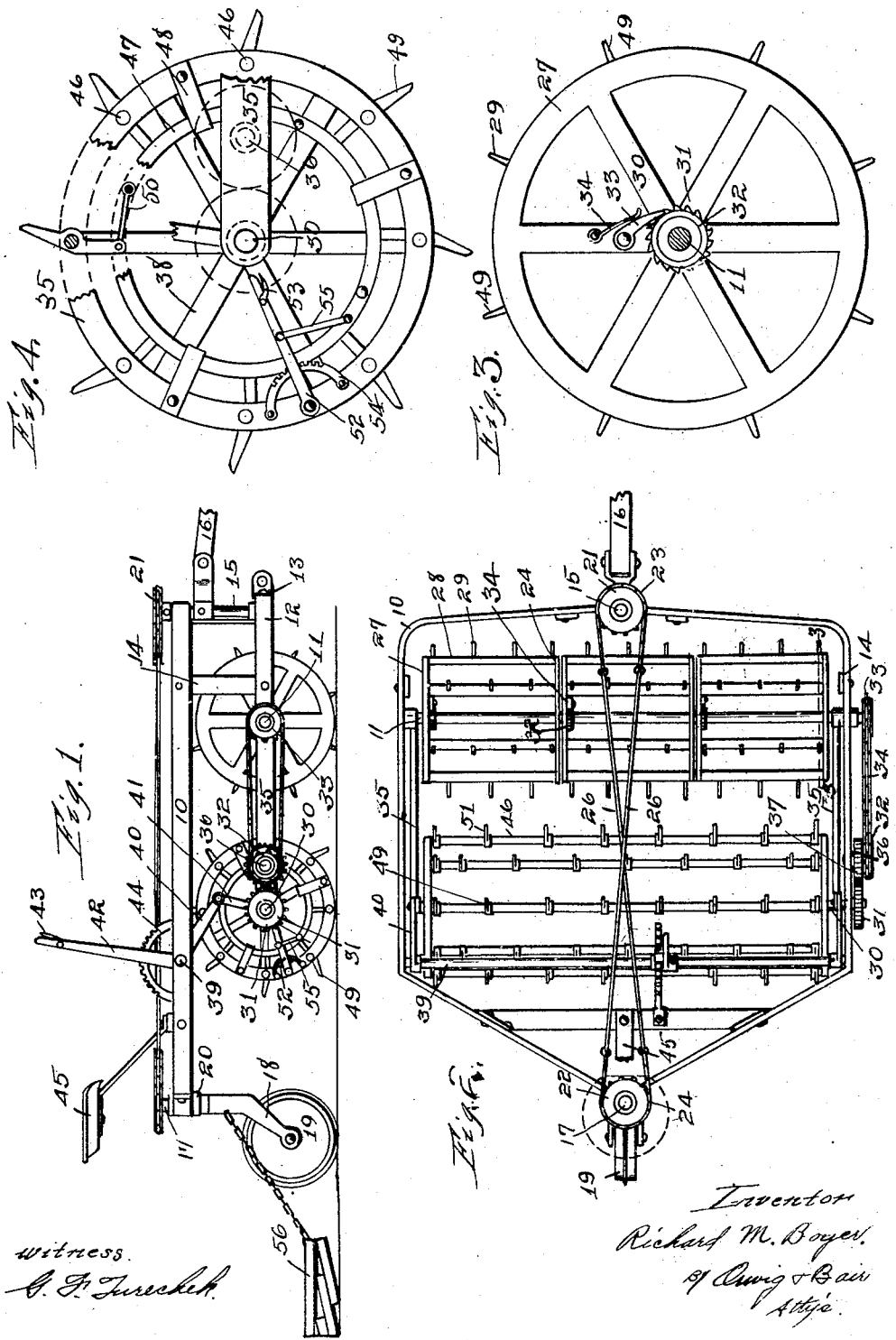

RICHARD M. BOYER, OF OSKALOOSA, IOWA, ASSIGNOR OF ONE-HALF TO CHARLES HOOVER, OF OSKALOOSA, IOWA.

CYLINDER-HARROW.

1,246,388.  Specification of Letters Patent.  Patented Nov. 13, 1917.

Application filed July 31, 1916.  Serial No. 112,422.

*To all whom it may concern:*

Be it known that I, RICHARD M. BOYER, a citizen of the United States, and resident of Oskaloosa, in the county of Mahaska and State of Iowa, have invented a new and useful Cylinder-Harrow, of which the following is a specification.

The object of my invention is to provide a cylinder harrow of simple, durable and inexpensive construction.

A further object is to provide a harrow of the general type mentioned having a frame and a rotary supporting member and a supporting wheel or wheels and having a toothed cylinder adjustably supported on said frame and geared to said rotary supporting member.

A further object is to provide in said machine a cylinder geared to rotate in the opposite direction from the rotary supporting member when the machine is traveling over the ground.

Still a further object is to provide in said machine, a cylinder having teeth capable of adjustment to different angles with relation to the ground over which the machine travels.

Figure 1 shows a side elevation of a cylinder harrow embodying my invention.

Fig. 2 shows a top or plan view of the same.

Fig. 3 shows a vertical, sectional view taken on the line 3—3 of Fig. 2, and

Fig. 4 shows an end elevation of the rotary digging cylinder, parts being broken away.

In the exemplification of my invention, shown in the accompanying drawings, I have used the reference numeral 10 to indicate the frame of my improved cylinder harrow. Extending transversely across the machine beneath the forward portion of the frame 10 is a shaft 11. The ends of the shaft 11 are supported in longitudinally arranged frame members 12 which extend forwardly from the shaft 11 and are connected at their forward ends by a transverse frame member 13. Upright frame members 14 connect the frame members 12 with the frame. Supported on the forward part of the frame 10 and on the member 13 is a rotatable shaft 15. Fixed on the shaft 15 between the members 13 and 10, is a tongue 16.

Rotatably supported at the central rear portion of the machine, is an upright shaft 17 carrying at its lower end rearwardly and downwardly extending spaced arms 18 between which is mounted a caster wheel 19. The shaft 17 is adapted to rotate in its bearing 20 on the frame 10. Mounted on the upper ends of the shafts 15 and 17 are sprocket wheels 21 and 22. Extended around the forward portion of the wheel 21 and the rearward portion of the wheel 22, are chains 23 and 24. The ends of the chain 23 are connected with the ends of the chain 24 by means of a flexible device 26 which is crossed between the sprocket wheels 21 and 22, so that rotation of one of said sprocket wheels in one direction will impart rotation to the other sprocket wheel in the other direction. Thus when the tongue 16 is moved laterally in turning the machine, the shaft 15 will be rotated, thereby imparting rotation to the sprocket wheels 21 and 22 so that the caster wheel 19 is turned in the opposite direction to that of the movements of the tongue 16.

Mounted on the shaft 11, is a rotary supporting device which as shown is made in three sections. Each section comprises a pair of rims 27 spaced from each other and connected by a plurality of parallel spaced transverse members 28. The members 28 are provided with radially outwardly extending teeth 29. Extending radially inwardly from the rims 27 are spokes 30 which are connected at their inner ends by a common web 31, which serves as a bearing for the shaft 11. Fixed on the shaft 11 and adjacent to each section of the rotary supporting device is a ratchet wheel 32.

Pivotally mounted, for instance on one of the spokes 30 of each of said sections, is a pawl 33 which is yieldingly held in engagement with the teeth of the adjacent sprocket wheel 32 by means of the spring 34. Pivoted to the shaft 11 near each end thereof, is a rearwardly extending frame member 35.

Rotatably mounted in the rear ends of the frame members 35 is a transverse shaft 30. On one end of shaft 30 is a pinion 31. Mounted in one of the frame members 35 is a stub shaft 36 on which is a pinion 37 in mesh with the pinion 31. On the stub shaft 36 is a sprocket gear 32 in line with the sprocket gear 33 on the shaft 11. A chain 34 travels on the sprockets 32 and 33. Near each end of shaft 30 is a wheel having the rim 35 and spokes 38 which are fixed with relation to shaft 30.

Rotatably mounted on the frame 10 is a rock shaft 39 preferably slightly rearwardly from the shaft 30. Secured to the rock shaft 39 near its ends are downwardly and forwardly extending parallel arms 40 and pivoted to the forward ends of the arms 40, are downwardly extending links 41 in the lower ends of which the shaft 30 is journaled. Secured to the rock shaft 39 is a lever 42 having an ordinary spring actuated pawl mechanically arranged to co-act with a sector 44 on a frame of the machine.

Suitably mounted on the frame near the rear portion thereof, is a seat 45.

The rims 35 are connected by transverse frame members 46. Located near each rim 35 is a ring 47 of smaller diameter than the rim 35 and preferably mounted in brace members 48 in which the rings 47 may rotate.

The transverse members 46 are preferably in the form of rods or shafts having their ends rotatably mounted in rims 35. Centrally fixed on the rods 46 are a plurality of teeth 49 having pointed outer ends and having their inner ends pivoted to the links 50. The links 50 are pivoted to the rings 47, as illustrated in Fig. 4.

Fixed on the members 46 between the rims 35 are other teeth 51 similar to the teeth 49, except that they do not have the portions extending inwardly past the rim, which in the case of the teeth 49 serve for adjustment of the links 50.

Pivoted to the rims 35 are levers 52 having ordinary spring actuated pawl mechanisms 53 adapted to coact with a sector 54 on each rim 35.

Pivoted to each of the levers 52 is a link 55. The links 55 are also pivoted to the respective rings 47. It will be seen that adjustment of the levers 52 will result in imparting limited rotary movement to the rings 47 whereby the teeth 49 will be moved for imparting some rotation to the members 46, thereby varying the positions of the teeth 49 and 50 and determining the angles at which said teeth will strike the ground.

I preferably connect a drag 56 to the frame of my machine so that it travels over the ground which has been stirred by the other mechanism.

In the practical use of my improved cylinder harrow, the machine is drawn over the ground by any suitable motive power.

By manipulation of the lever 42, the shaft 30 may be raised or lowered, thereby raising or lowering the digging and cultivating teeth.

The cylinder cultivator is so geared that it travels in a direction opposite that of the travel of the rotary supporting member at the front of the machine.

The teeth on the front rotary supporting member loosen the dirt, so that when the rotary cylinder travels over it, the dirt will be thoroughly stirred and cultivated.

The depth of the cut of the teeth may be regulated by means of the lever 42, and the depth and character of the action of the teeth may also be regulated by means of the levers 52.

It will be noted that the cylinder harrow is adjustably supported on the frame, so that its weight is carried on the frame.

The drag 56 is designed for smoothing and packing a road or for smoothing the surface of a field and for making a dust mulch.

The main weight of the machine is supported upon the supporting rotary members and not on the cylinder harrow.

Some changes may be made in the construction and arrangement of the parts of my improved cylindrical harrow without departing from the essential features and purposes thereof, and it is my intention to cover by this application any such changes which may be included within the scope of my claims.

I claim as my invention:

1. In a harrow, a frame, a shaft journaled therein, a pair of spaced disks of the same size journaled thereon, a plurality of parallel spaced rods pivoted at each end in one of the disks adjacent to the periphery of the latter, a plurality of outwardly extending teeth mounted on each rod, a ring of smaller diameter than the disks, said ring being rotatably and concentrically mounted relative to such disks, a lug extending inwardly from each of said rods to a point adjacent to the periphery of said ring, a plurality of links pivoted at one end to one of the lugs, and at the other end to the rings, and means for selectively fixing the ring from rotation relative to the disks in any one of several predetermined positions.

2. In a harrow, a frame, a shaft journaled therein, a pair of spaced disks of the same size journaled thereon, a plurality of parallel spaced rods pivoted at each end in one of the disks adjacent to the periphery of the latter, a plurality of outwardly extending teeth mounted on each rod, a ring of smaller diameter than the disks, said ring being rotatably and concentrically mounted relative to such disks, a lug extending inwardly from each of said rods to a point adjacent to the periphery of said ring, a plurality of links pivoted at one end to one of the lugs, and at the other end to the rings, a bracket mounted in fixed relation to the shaft, a lever pivoted to said bracket, means for operatively connecting said lever with the ring and means for locking said lever in a plurality of predetermined positions.

Des Moines, Iowa, June 27, 1916.

RICHARD M. BOYER.

Copies of this patent may be obtained for five cents each, by addressing the "Commissioner of Patents, Washington, D. C."